US007984052B2

(12) United States Patent
Griffith et al.

(10) Patent No.: US 7,984,052 B2
(45) Date of Patent: Jul. 19, 2011

(54) SYSTEM AND METHOD FOR INTEGRATION OF DATA RECORDS HAVING DIFFERING DATA TYPES TO A GEOGRAPHICAL INFORMATION SYSTEM

(75) Inventors: Frank P. Griffith, Bellevue, NE (US); Gregory P. Armendariz, Papillon, NE (US); Robert W. Bowne, Papillon, NE (US); Lee R. Venable, Lavista, NE (US)

(73) Assignee: Raytheon Company, Waltham, MA (US)

( * ) Notice: Subject to any disclaimer, the term of this patent is extended or adjusted under 35 U.S.C. 154(b) by 966 days.

(21) Appl. No.: 11/761,907

(22) Filed: Jun. 12, 2007

(65) Prior Publication Data
US 2008/0313224 A1 Dec. 18, 2008

(51) Int. Cl.
*G06F 7/00* (2006.01)
*G06F 17/30* (2006.01)
(52) U.S. Cl. .............................. 707/736; 707/758; 702/3
(58) Field of Classification Search .......................... None
See application file for complete search history.

(56) References Cited

U.S. PATENT DOCUMENTS

| 6,298,307 | B1 * | 10/2001 | Murphy et al. ................... 702/3 |
| 6,938,079 | B1 * | 8/2005 | Anderson et al. ............. 709/222 |
| 7,082,382 | B1 * | 7/2006 | Rose et al. ..................... 702/183 |
| 7,103,627 | B2 * | 9/2006 | Kittredge et al. ............. 709/201 |
| 7,565,662 | B2 * | 7/2009 | Martin et al. ................. 719/318 |
| 7,873,567 | B2 * | 1/2011 | Eder .............................. 705/38 |
| 2002/0184610 | A1 * | 12/2002 | Chong et al. .................. 717/109 |
| 2003/0156734 | A1 * | 8/2003 | Wolfson et al. ............... 382/100 |
| 2004/0162675 | A1 * | 8/2004 | Moon et al. ....................... 702/3 |
| 2004/0239550 | A1 * | 12/2004 | Daly, Jr. ....................... 342/26 B |
| 2005/0096849 | A1 * | 5/2005 | Sorrells .......................... 702/19 |
| 2006/0100912 | A1 * | 5/2006 | Kumar et al. ..................... 705/4 |
| 2007/0016565 | A1 * | 1/2007 | Evans et al. ....................... 707/3 |
| 2007/0027903 | A1 * | 2/2007 | Evans et al. ................... 707/102 |
| 2007/0156793 | A1 * | 7/2007 | D'Souza et al. .............. 707/204 |
| 2007/0214023 | A1 * | 9/2007 | Mathai et al. ..................... 705/4 |
| 2008/0243990 | A1 * | 10/2008 | Mallik et al. ................. 709/203 |

FOREIGN PATENT DOCUMENTS
EP 1 426 879 A2 9/2004
EP 1 698 984 A1 6/2006

OTHER PUBLICATIONS

PCT Notification of Transmittal of the International Search Report and the Written Opinion of the International Searching Authority, or the Declaration, mailed Oct. 15, 2008, in re PCT/US 2008/066535 filed Jun. 11, 2008 (12 pages).

* cited by examiner

*Primary Examiner* — Usmaan Saeed
(74) *Attorney, Agent, or Firm* — Baker Botts L.L.P.

(57) ABSTRACT

According to one embodiment of the disclosure, a computing system generally includes a geographical information system that is coupled to a data record interface. The data record interface is operable to receive a data record having a data type that is different from a second data type used by the geographical information system. The data record may then determine the data type of the data record and accordingly invoke a particular plug-in that is operable to convert the first data type to the second data type. The data record interface may then transmit the converted data record to the geographical information system.

11 Claims, 2 Drawing Sheets

SYSTEM AND METHOD FOR INTEGRATION OF DATA RECORDS HAVING DIFFERING DATA TYPES TO A GEOGRAPHICAL INFORMATION SYSTEM

GOVERNMENT RIGHTS

This invention was made with Government support via Contract No. DG133W-05-CQ-1067. The Government may have certain rights in this invention.

TECHNICAL FIELD OF THE DISCLOSURE

This disclosure generally relates to geographical information systems, and more particularly, to a system and method for integration of data records having differing data types to a geographical information system.

BACKGROUND OF THE DISCLOSURE

Geographical information systems (GISs) generally refer to computer executable systems that enable analysis of geospatially related information. One particular type of geographical information system is a weather interactive processing system (WIPS). Weather interactive processing systems utilize meteorological and/or hydrological information that may or may not be geospatially related to analyze weather patterns over various geographical regions. Using these systems, relatively accurate weather patterns may be determined for the issuance of weather related announcements, such as storm warnings, flood warnings, tornado warnings, various advisories, and other weather related forecasts that may affect the public.

SUMMARY OF THE DISCLOSURE

According to one embodiment of the disclosure, a computing system generally includes a geographical information system that is coupled to a data record interface. The data record interface is operable to receive a data record having a data type that is different from a second data type used by the geographical information system. The data record may then determine the data type of the data record and accordingly invoke a particular plug-in that is operable to convert the first data type to the second data type. The data record interface may then transmit the converted data record to the geographical information system.

Some embodiments of the disclosure provide numerous technical advantages. Some embodiments may benefit from some, none, or all of these advantages. For example, according to one embodiment, executable functions unique to a data type may be stored in and executed from a corresponding plug-in that is configured to handle that particular data type. The plug-in may include sufficient functionality to de-couple handling of data records with a data type that differs from a data type used by the geographical information system. In the event that access to a new data type is desired during deployment, a new plug-in may be created without requiring modifications to the geographical information system. Using this abstraction model, existing plug-ins may also be modified due to occasional changes in data record structure over time without modification of the underlying executable code of the geographical information system.

Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Weather interactive processing systems (WIPS) facilitate the analysis of weather related information that may occur over various geographical regions in order to formulate relatively accurate predictions of future weather behavior. To enable this level of accuracy, these weather interactive processing systems may combine weather related data from numerous data sources. These data sources, however, may provide weather related data that are generally diverse in type and thus not easily adaptable to for use with the weather interactive processing system. For example, weather related information, such as meteorological aerodrome report (METAR) weather data, may be textual-based that is generally incompatible with raster-based weather data, such as satellite data. In another example, a particular data source may provide weather related information that is referenced to a geodetic reference system, such as a North American Datum 83 (NAD-83), which is generally incompatible with weather related information referenced to a world geodetic system 84 (WGS-84).

To alleviate these problems, weather interactive processing systems have been designed to convert weather related data from differing data sources into a common form or data type. However, the widely diverse nature of these data sources as well as their ever changing formats have complicated the ability to use all available weather related data in an efficient manner.

Figure 1:
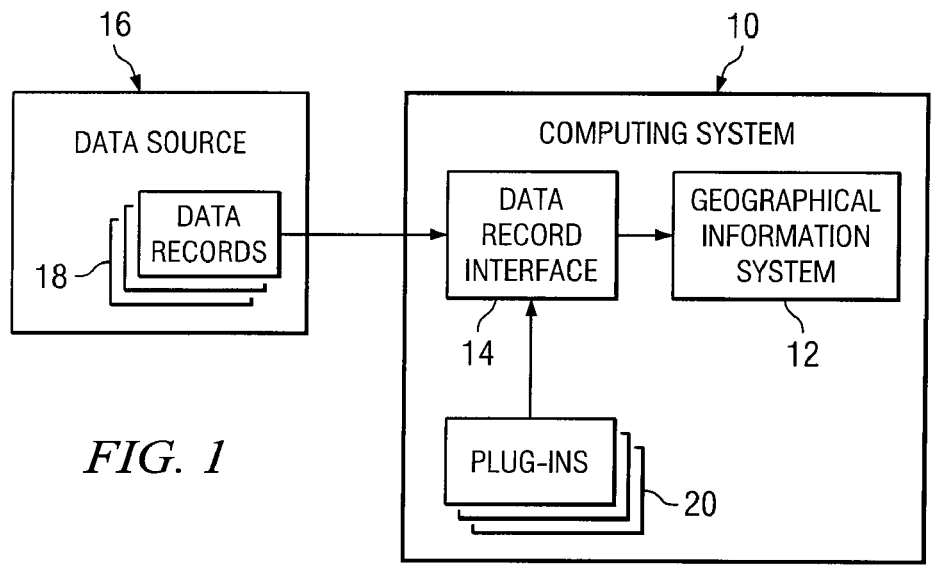
FIG. 1 is a block diagram showing one embodiment of a system for integration of data records having differing data types to a geographical information system.

FIG. 1 shows one embodiment of a computing system 10 for integration of data records having differing data types to a geographical information system that may provide a solution to the previously described problems as well as other problems. Computing system 10 generally includes a geographical information system (GIS) 12 that is coupled to a data record interface 14. Data record interface 14 may be coupled to a data source 16 having a number of data records 18 including weather related information that may be used by geographical information system 12. According to the teachings of the present disclosure, data record interface 14 may be operable to convert the data type of data records 18 into a differing data type using plug-ins 20.

Certain embodiments of the present disclosure may provide an advantage in that data records 18 created or modified following deployment of the geographical information system 12 may be implemented for use without significant modification to the geographical information system 12. In one example, data records 18 having new data types may be developed after deployment of geographical information system 12 because new technologies make available data not previously possible, such as satellite image data that may use a newly devised imaging technique, for example. Due to the relatively compact, dedicated nature of plug-ins 20, development time and costs may be reduced by alleviating the need for significant modification to the geographical information system 12. An additional advantage may be provided in that occasional refinements to existing plug-ins 20 may be made to enhance the compatibility of differing data records 18. For example, metrics from which geospatially related information is obtained may deviate over time. Occasional modification of conversion algorithms in the plug-in 20 may counteract the effects of these deviations without significant modification to the geographical information system 12.

Computing system 10 may be any suitable computing system that may be, for example, a personal computer, laptop computer, a personal digital assistant (PDA), or a mainframe computing system. Geographical information system 12 may be any suitable computer executable program that is configured to enable analysis of geospatially related information. In one embodiment, geographical information system 12 is a weather interactive processing system. In another embodiment, weather interactive processing system may be an advanced weather interactive processing system (AWIPS), such as used by the National Weather Service (NWS).

Data source 16 may be any suitable source of data records 18 having geospatially related information. Although only one data source 16 is shown, it should be appreciated that geographical information system 12 may be configured to receive data records 18 from a number of differing data sources 16. Data source 16 may be coupled to data record interface 14 using any suitable communication link that may be, for example, a network, such as the Internet. In another embodiment, data source 16 may be an integral part of computing system 10 in which the data record interface 14 communicates with the data source 16 using internal system calls.

In one embodiment, data records 18 may include textual-based information, such as meteorological aerodrome report (METAR) data, vector-based information, such as gridded binary (GRIB) data format, and/or raster-based information, such as satellite or radar data. In another embodiment, data records 18 may include any weather related information that may be, for example, standard hydrologic exchange format (SHEF), terminal aerodrome forecasts (TAF), and/or aeronautical data format (ADF).

Figure 2:
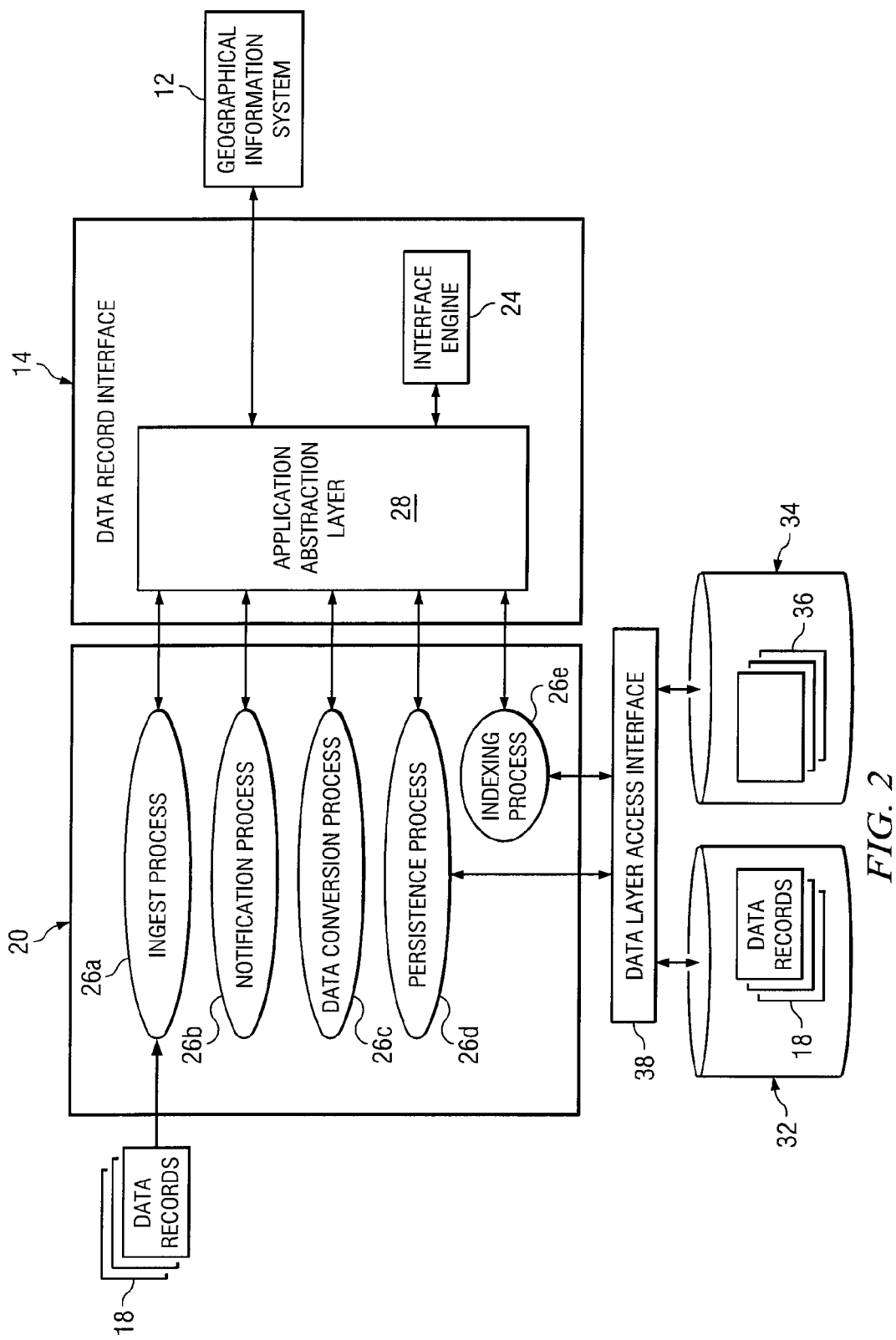
FIG. 2 is a block diagram showing several features of the embodiment of FIG. 1.

FIG. 2 is a block diagram showing the interaction of the data record interface 14 and plug-in 20 for handling receipt and conversion of data records 18 used by the geographical information system 12. Data record interface 14 has an interface engine 24 that may perform common tasks for receipt and conversion of data records 18 to a data type suitable for use by the geographical information system 12. Data record interface 14 and plug-in 20 may be executable on computing system 10 using computer instructions stored in a memory. An example of one common task is identifying the data type of a particular data record 18 and invoking an appropriate plug-in 20 corresponding to that data type.

The interface engine 24 may call any of a number of processes 26 within plug-in 20 in order to perform tasks that may be unique to particular data records 18 received by the computing system 10. In one embodiment, the plug-in 20 may include tasks that may be conceivably unique to particular data records 18 that may be used in the future. In this manner, revisions to existing plug-ins 20 or creation of new plug-ins 20 may be made without significant modification to a previously deployed geographical information system 12.

Plug-in 20 has several processes 26 that may perform various tasks on data records 18 received from data source 16. These processes 26 may be provided by executable code stored in plug-in 20. When the plug-in 20 is invoked by interface engine 24, the processes 26 may be called by interface engine 24 to perform these various tasks. In one embodiment, each process 26 may communicate with each other and with the interface engine 24 using an application abstraction layer 28. In another embodiment, application abstraction layer 28 is implemented using a Java messaging service (JMS). Java messaging service is a type of message oriented middleware (MOM) that enables the asynchronous transmission of messages between clients. Thus in this particular embodiment, implementation of application abstraction layer 28 using a java messaging service, may allows receipt and transmission of messages among the interface engine 24 and processes 26 in a relatively efficient manner.

An ingest process 26a may be provided to receive data records 18 from the data source 16. In one embodiment, ingest process 26a may perform any system level activities to enable receipt of data records 18 through an input/output port. In another embodiment, ingest process 26a may perform preliminary tasks on data records 18 that may include parsing of information contained in data record 18 into individual fields.

A notification process 26b may be provided to alert other processes 26 and/or the geographical information system 12 of receipt of a new data record 18. In one embodiment, the notification process 26b may alert other processes 26 and/or the geographical information system 12 using a subscription model in which particular processes 26 may receive notification of receipt of a new data record 18 having a particular data type. For example, the geographical information system 12 may generate an active subscription requesting immediate receipt of particular data records 18, such as satellite image data. Upon receipt of data records 18 including satellite image data, the geographical information system 12 may then issue requests for information included in these data records 18.

A data conversion process 26c may be provided to convert the data type of received data records 18 to a data type suitable for use by geographical information system 12. This conversion may include any executable algorithm that maps information in data record 18 to another data type. For example, data conversion process 26c may include a conversion algorithm that maps a particular geodetic reference system to another. As another example, data conversion process 26c may associate data records 18 having textual-based information with other data records 18 having raster-based satellite image files for display on a common display. In one embodiment, data conversion process 26c may encapsulate information from data records 18 within an extensible markup language (XML) message. The extensible markup language is a general purpose markup language that enables formatting of disparate types of data into a common format. According to this particular embodiment, usage of extensible markup language messages allow formatting of data records 18 having disparate data types into an uniform data type that is readily usable by the geographical information system 12.

A persistence process 26d may be provided to enable temporary storage of data records 18 in a database 32. In this manner, access to data records 18 may be provided at an elapsed period of time following receipt of data records 18 by the computing system 10. The geographical information system 12 may communicate with persistence process 26d to retrieve one or more data records 18 stored in database 32 through the application abstraction layer 28. In one embodiment, persistence process 26d may administer purging of obsolete data records 18 from database 32. That is, persistence process 26d may configured to remove data records 18 from database 32 following an elapsed period of time in which information in data record 18 becomes obsolete.

An indexing process 26e may also be provided to manage metadata records 36 that are stored in a metadata database 34. Each metadata record 36 may be associated with a corresponding data record 18. A metadata record 36 may be generally referred to as a type of record that includes abbreviated information relative to its corresponding data record 18. In one embodiment, metadata records 36 may be stored in metadata database 34 according to a structured query language (SQL) schema. In this manner, individual fields of each metadata record 36 may be organized in a relational type database structure for enhanced search and analysis of information stored in database 32.

In one embodiment, indexing process 26e may be operable to extract metadata information from data records 18 for storage in metadata database 34. Extraction of metadata may include creation of metadata records 36 from data records 18 having no associated metadata information. Extraction of metadata may also include modification of metadata information in data records 18 having metadata information that is not structured according to a suitably compliant structured query language schema. In another embodiment, each metadata record 36 may include a uniform resource identifier (URI) field. Certain embodiments of metadata records 36 incorporating a uniform resource identifier may enable searches for metadata records 36 and their associated data records 18 in a relatively fast and efficient manner.

Access to database 32 or metadata database 34 may be provided by a data layer access interface 38. Data layer access interface 38 brokers requests from persistence process 26d or indexing process 26e to database 32 or metadata database 34. Data layer access interface 38 may also associate metadata records 36 with their corresponding data records 18 during storage of each data record 18 in database 32 or during requests for data records 18 by geographical information system 12.

Figure 3:
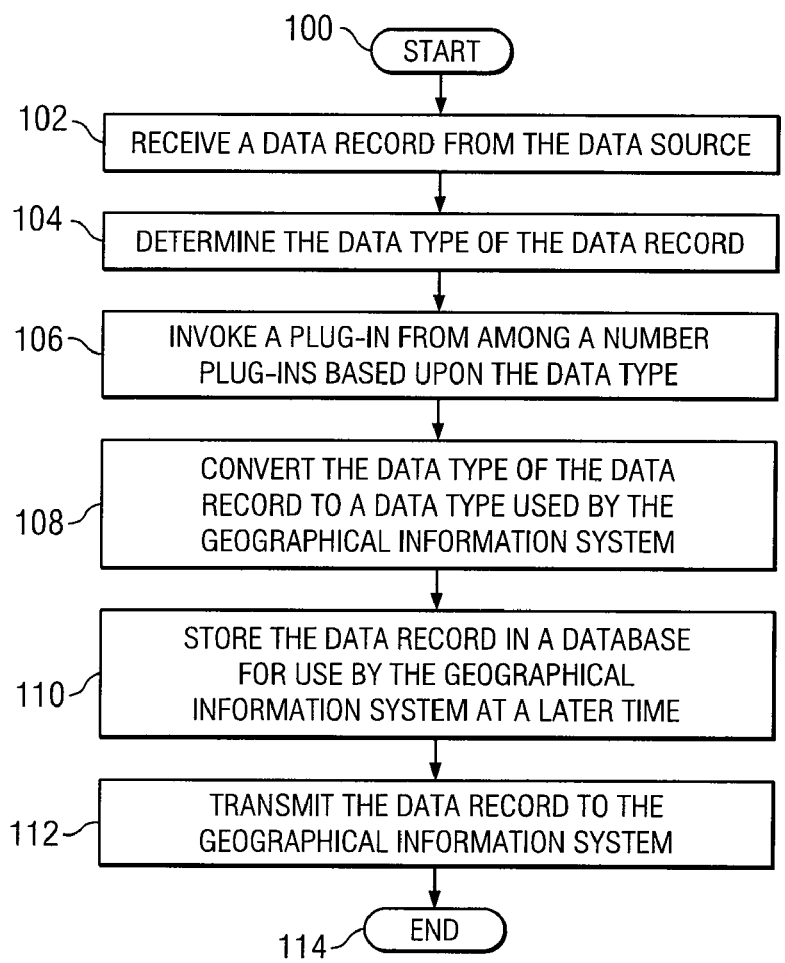
FIG. 3 is a flowchart showing one embodiment of a series of actions that may be taken in order to integrate the data records for use by the geographical information system.

FIG. 3 shows one embodiment of a series of actions that may be taken by data record interface 14 to convert a data record 18 to a data type suitable for use by geographical information system 12. In act 100, the process is initiated. The process may be initiated by launching geographical information system 12 and data record interface 14 on computing system 10 as well as configuring data record interface 14 to receive data records 18 from data source 16.

In act 102, the data record interface 14 may receive one or more data records 18 from the data source 16. The data records 18 may be received over a communication link such as a network or the data records 18 may be received from a data source 16 internal to the computing system 10. The data record 18 may or may not have a data type that is different than a data type used by the geographical information system 12.

In act 104, the data record interface 14 may determine the data type of the data record 18 using any suitable approach. Examples of suitable approaches to determine the data type of the data record 18 may include reading the filename extension of the data record 18 or by sensing the overall data structure of the data record 18. Based upon the data type determined in act 104, the data record interface 14 may invoke a plug-in 20 from among a number of plug-ins in act 106. Each plug-in 20 may be configured to convert a particular data type of a data record 18 into a common data type used by the geographical information system 12.

In act 108, the data record 18 may be converted to a data type commonly used by the geographical information system 12. Conversion of data record 18 may be performed using any known approach and any other conversion technique yet to be developed. Examples of conversion of data record 18 may include conversion of a coordinate system from which the data is referenced, conversion of textual-based data to a form suitable for use with raster-based data, association of non-geographically referenced data with a particular geographical region, and/or interpolation of data among multiple data records 18 of differing types to name a few.

In act 110, the data record interface 14 may optionally store the data record 18 in a database 32 for use at a later time. In one embodiment, a metadata record 36 corresponding to the data record 18 may be created by extracting information from information included in the data record 18. In another embodiment, the metadata record 36 may be stored in a relational form for storage and retrieval using a structured query language (SQL) schema. In another embodiment, each metadata record 36 may include a uniform resource identifier (URI) field. In act 112, the data record 18 may be transmitted to the geographical information system 12.

The previously described series of actions may be repeated with each data record 18 received by the data record interface 14. When use of the geographical information system 12 is no longer needed or desired, the geographical information system 12 and its associated data record interface 14 may be halted at which time the process is ended in act 114.

A system and method for integration of data records having differing data types to a geographical information system 12 has been described that may provide enhanced use with numerous data sources of differing types. Implementation of executable code in individual plug-ins 20 effectively de-couples handling of differing data types from the geographical information system 12 and thus minimizes impact of adding new data type capability during the serviceable life of the geographical information system 12. Each plug-in 20 may include various processes 26 that perform various tasks that may be unique to each data type. For example, the persistence process 26d may be implemented in the plug-in 20 in order to handle formatting of the data record 18 in a manner suitable for storage with other data records 18 having differing data types. Thus, the persistence process 26d, as well as other processes 26 that may have unique tasks for differing data types may be executable from the plug-in 20 for enhanced extensibility of the geographical information system 12.

Although the present disclosure has been described in detail, it should be understood that various changes, substitutions, and alterations can be made hereto without departing from the spirit and scope of the disclosure as defined by the appended claims.

What is claimed is:

1. A method comprising:
   receiving, by a data record interface coupled to a weather interactive processing system, a data record including geospatially related information from a data source, the data record having a first data type that is different than a second data type used by the weather interactive processing system, wherein the weather processing system processes and enables analysis of weather related information;
   determining the first data type of the data record;
   invoking a plug-in that is selected from a plurality of plug-ins based upon the first data type;
   converting, using the plug-in, the first data type of the data record to a second data type;
   storing the data record in a first database;
   extracting metadata information from the data record and store the metadata information as a metadata record in a structured query language database; and transmitting the data record to the weather interactive processing system;
the plurality of plug-ins comprising a plurality of processes, the plurality of processes comprising:
an ingest process receiving the data record and parsing information in the data record into a plurality of individual fields;
a conversion process converting the first data type of the data record to the second data type used by the weather interactive processing system; and
a persistence process enabling temporary storage of the data records in the first database;
the data record interface comprising an application abstraction layer, the application abstraction layer providing communications with the plurality of processes of the plurality of plug-ins; and
the application abstraction layer being implemented using a Java messaging service.

2. The method of claim 1, wherein creating the metadata record further comprises creating the metadata record having a uniform resource identifier.

3. The method of claim 1, further comprising notifying the weather interactive processing system of the presence of the data record that has been received.

4. The method of claim 1, further comprising encapsulating the data record in an extensible markup language message.

5. The method of claim 1, further comprising notifying the weather interactive processing system of receipt of the data record.

6. A computing system comprising:
a processor;
a weather interactive processing system configured to process and enable analysis of weather related information; and
a data record interface coupled to the weather interactive processing system and configured to:
receive a data record including geospatially related information, the data record having a first data type being different than a second data type used by the weather interactive processing system;
determine the first data type of the data record;
invoke a plug-in from among a plurality of plug-ins, the plug-in configured to convert the first data type of the data record to the second data type used by the weather interactive processing system;
store the data record in a first database;
extract metadata information from the data record and store the metadata information as a metadata record in a structured query language database; and
transmit the data record to the weather interactive processing system;
the plurality of plug-ins comprising a plurality of processes, the plurality of processes comprising:
an ingest process configured to receive the data record and parse information in the data record into a plurality of individual fields;
a conversion process configured to convert the first data type of the data record to the second data type used by the weather interactive processing system; and
a persistence process configured to enable temporary storage of the data records in the first database;
the data record interface comprising an application abstraction layer, the application abstraction layer configured to provide communications with the plurality of processes of the plurality of plug-ins; and
the application abstraction layer being implemented using a Java messaging service.

7. The computing system of claim 6, wherein the first data type is selected from the list consisting of meteorological Aerodrome Report format, gridded binary (CRIB) data format, satellite raster format, radar raster format, standard hydrologic exchange format (SHEF), terminal aerodrome forecasts (TAF) format, and aeronautical data format (ADF).

8. The computing system of claim 6, further comprising a data layer access interface coupled between the plug-in and the first database and the second database, the data layer access interface operable to associate the metadata with its corresponding data record.

9. The computing system of claim 6, wherein the metadata record includes a uniform resource identifier (URI).

10. The computing system of claim 6, wherein the data record is encapsulated in an extensible markup language (XML) message.

11. The computing system of claim 6, wherein the data record interface is a Java virtual machine.

* * * * *